Jan. 14, 1969 TAKAJI FUNAHASHI 3,421,437
REVOLVING STAMP

Filed Feb. 9, 1967 Sheet 1 of 5

FIG. 3
FIG. 4
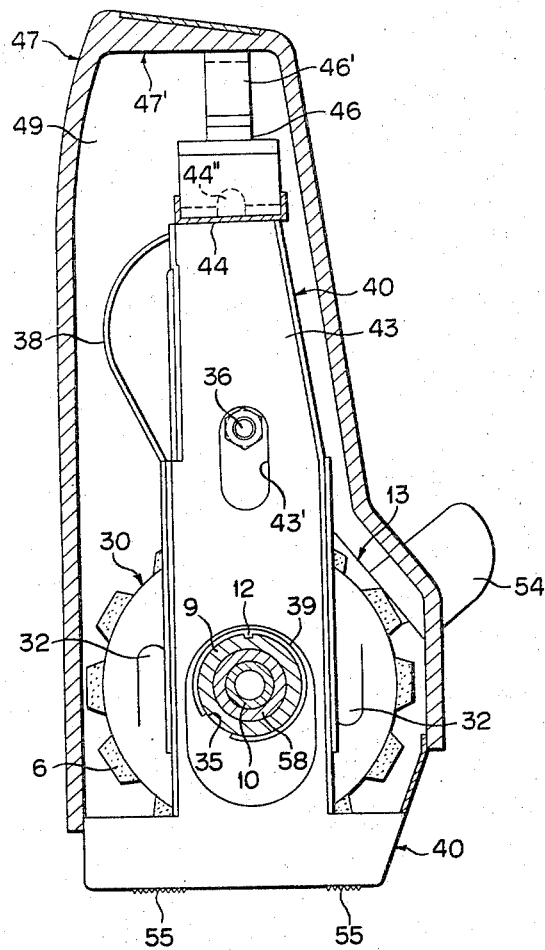
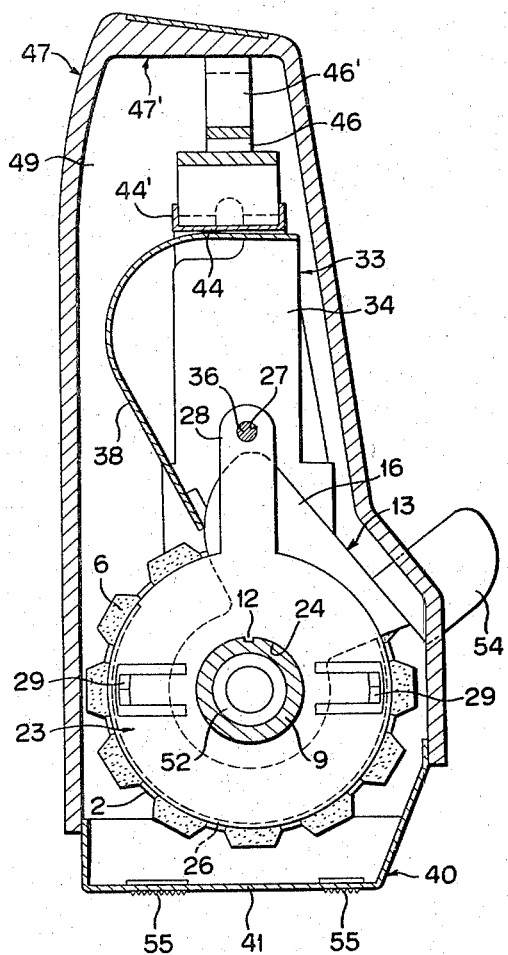

United States Patent Office 3,421,437
Patented Jan. 14, 1969

3,421,437
REVOLVING STAMP
Takaji Funahashi, 1, 2-chome Kitakajo-machi, Nishi-ku, Nagoya-shi, Aichi-ken, Japan
Filed Feb. 9, 1967, Ser. No. 614,923
U.S. Cl. 101—106
Int. Cl. B41j 1/60
12 Claims

ABSTRACT OF THE DISCLOSURE

A revolving stamp with a self-contained ink supply in a hollow shaft on which are mounted an absorber block and a surrounding rotary stamp member, and an actuator.

---

The present invention relates to a revolving stamp, and more particularly to a self-inking porous rubber revolving stamp for dating and numbering with lever actuation which comprises an embossed symbol block cover mounted inside of a casing on a tubular stem for feeding ink; a machine frame received in the inside of the side plates of said symbol block cover on said tubular stem; a driving element received within said frame on said tubular stem; and a rotor mounted within said driving element on said tubular stem, said rotor having an ink absorber and an annular embossed symbol block impregnated with ink, made of material such as porous rubber, wherein an elastic claw clutch of said driving element is so arranged as to be engaged with a circumferential slot of the rotor so that said clutch acts on the rotor in cooperation with a leaf spring to advance the rotor stepwise.

The conventional revolving stamps, such as a date stamp, are inconvenient in correctly and swiftly rotating the rotor and are also troublesome in handling since they must be inked after each stamping.

An object of the present invention is to provide a revolving stamp in which the desired symbols, such as letters or numerals, can be easily and accurately arranged by a simple lever system and also enabling the continuous stamping without necessity of the troublesome practice of applying ink to the symbol surface for each stamping.

Another object of the present invention is to provide a revolving stamp which permits continuous clear-cut stamping by utilizing a supply of ink in a tubular stem.

It is still another object of the present invention to provide a revolving stamp which is simple to assemble and suited for mass production.

Various features of the present invention will be explained in detail hereinbelow with reference to the accompanying drawings, in which:

FIGURE 3 is a sectional view taken on line III—III of FIG. 2;

FIGURE 4 is a sectional view taken on line IV—IV of FIG. 2;

Figure 1:
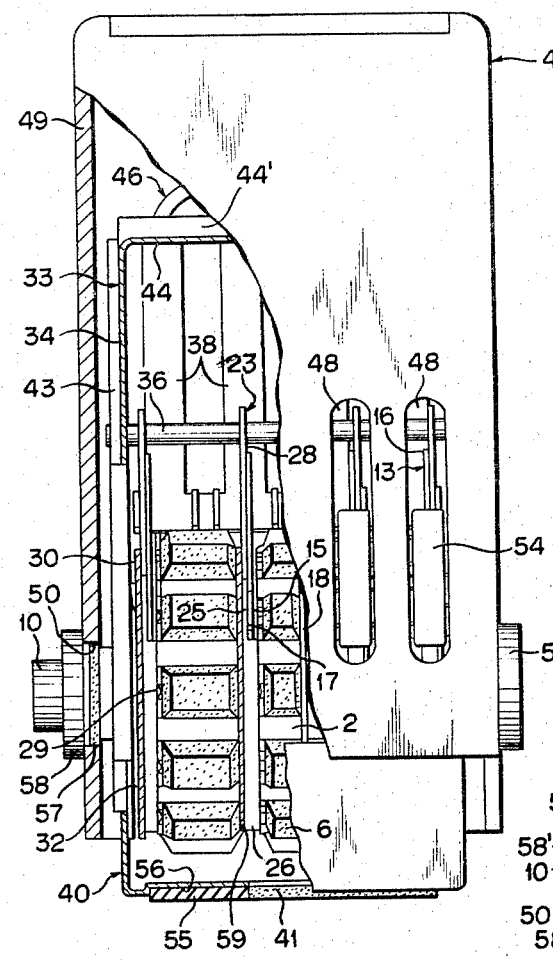
FIGURE 1 is a front elevation, with a part broken away, of a revolving stamp according to the present invention showing a rotatable stamp assembly therein.
Figure 2:
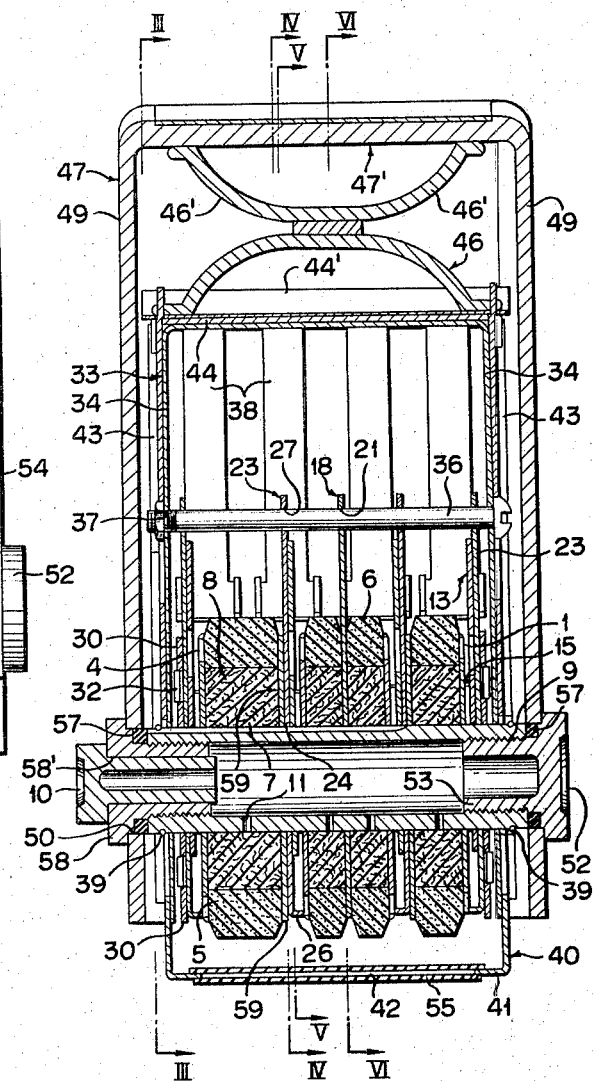
FIGURE 2 is a longitudinal sectional front view thereof.
Figure 7:
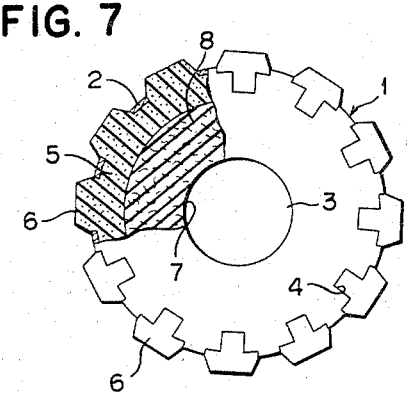
FIGURE 7 is a side elevation, with a part broken away, of a rotor provided with an ink absorber and an embossed symbol block made of porous rubber impregnated with ink therein used in the present invention.
Figure 8:
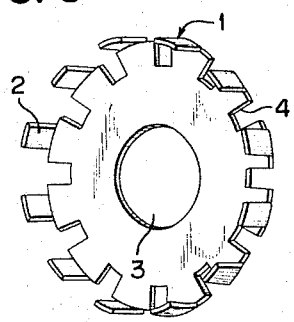
FIGURE 8 is a perspective view of the rotor used in the present invention.
Figure 13:
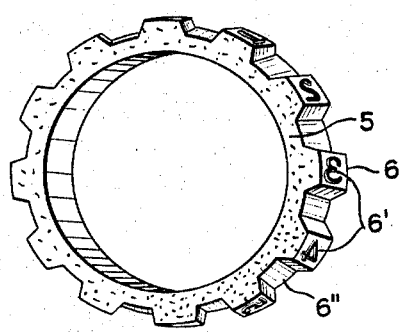
FIGURE 13 is a perspective view of an embossed symbol block.
Figure 14:
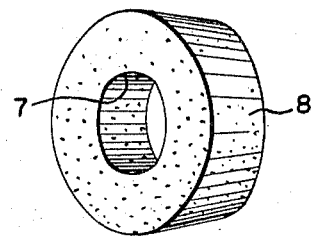
FIGURE 14 is a perspective view of an ink absorber.
Figure 15:
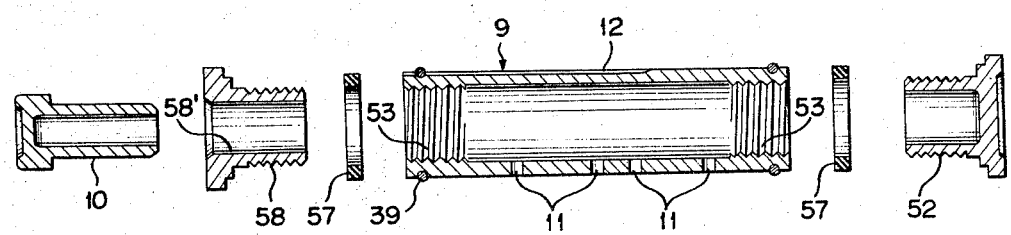
FIGURE 15 shows longitudinal sections of a tubular stem and various parts mounted at both ends thereof.

Referring to FIGS. 1, 2, 5, 7 and particularly 8, numeral 1 designates a plate-like circular rotor, which has, around its periphery, a plurality of spaced wing plates 2 extending in one direction substantially perpendicular to a plate part of said rotor. The rotor has a plurality of slots 4 in said plate part between said wing plates 2 extending radially in said plate part. In the center of the rotor 1 is a hole 3 in which a hollow tubular stem 9 is inserted. Numeral 5, as shown in FIGS. 1 to 7 and particularly in FIG. 13, denotes an elastic annular symbol block made of porous rubber material and impregnated with ink. Said block has formed alternately around its periphery a plurality of ridges 6 on each of which is embossed a symbol 6' to be stamped, such as a letter or numeral, and a plurality of indentations 6" between the ridges. This symbol block 5 is fitted within the rotor 1 in such manner that a symbol-embossed ridge 6 will protrude between adjoining wing plates 2, as shown in FIG. 7. Numeral 8, as shown in FIGS. 2 and 7, and particularly in FIG. 14 designates an annular ink absorber made of foamed hard synthetic resin or high-quality felt or the like which can withstand the pressing force imparted thereto by said symbol block 5. Said ink absorber 8 has a hole 7 for receiving the hollow tubular stem 9 and is fitted in said annular symbol block 5 impregnated with ink so that the periphery of said absorber 8 abuts the inside surface of the block 5. Stem 9, as shown in FIGS. 2 to 6 and particularly in FIG. 15, is inserted through the hole 3 in each rotor 1 and the hole 7 in the ink blotter 8. Ink will be injected through an opening at one end (left side in FIG. 2) of said stem 9. At the lower edge of said stem 9 are formed small holes 11 for the outflow of ink. These small holes may be provided in desired number according to the number of the ink absorbers 8 at suitable places to uniformalize, as much as possible, the amount of the ink flow. Also provided at a pertinent place on the wall of the tubular stem 9 is an elongated groove keyway 12 to retain the tubular stem 9 in position. In FIG. 15, numeral 39 denotes a stop ring, 53 a screw thread in the tubular stem 9, 57 a packing, 52 a stopper, 58 a set screw, 58' an ink inlet in the set screw 58, and 10 a plug.

Figure 9:
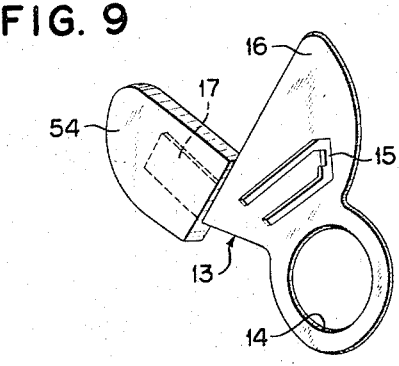
FIGURE 9 is a perspective view of a driving element used in the present invention.

Referring to FIGS. 1 to 6 and particularly to FIG. 9 numeral 13 indicates a plate-like driving element which comprises an elastic claw clutch 15 made of the same material as the driving element 13 engaged with one of the slots 4 of said rotor 1, a driving section 16, a lever section 17 and a stem hole 14. The lever section 17 is covered with a cap 54 made of material such as polyethylene resin. Said driving element 13, in the state shown in FIG. 9, is mounted at the back of the rotor 1 (see FIG. 2).

Figure 5:
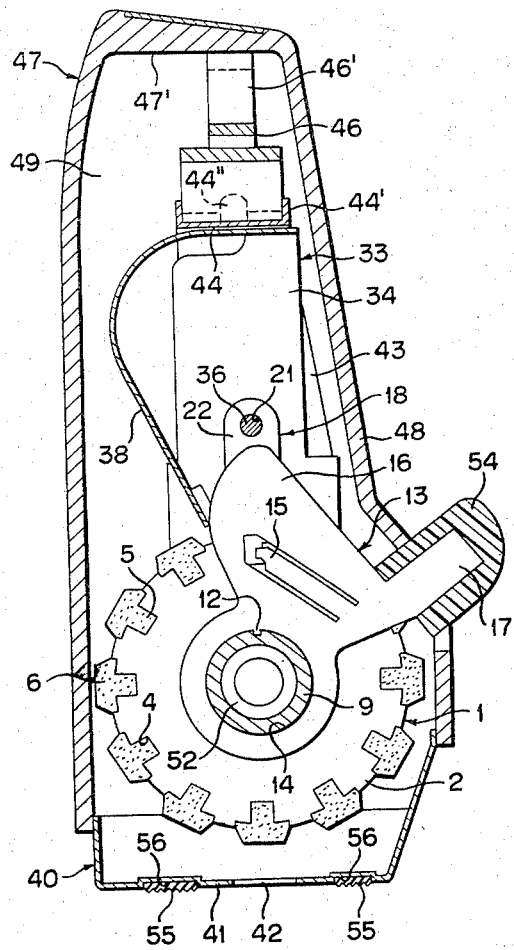
FIGURE 5 is a sectional view taken on line V—V of FIG. 2.
Figure 6:
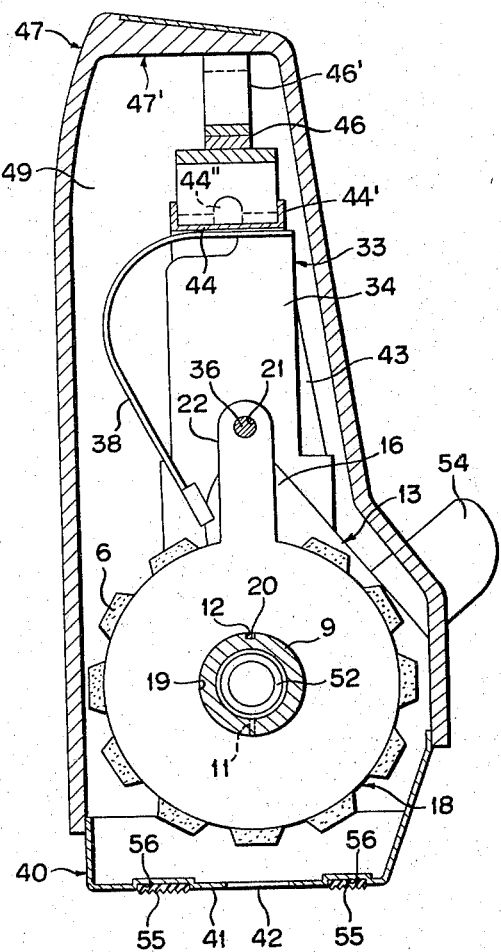
FIGURE 6 is a sectional view taken on line VI—VI of FIG. 2.

With reference now being made to FIGS. 1, 2, 5 and particularly to 6, numeral 18 denotes a spacing plate made of material such as stainless steel, which comprises a hole 19 receiving the tubular stem 9, a small projection 20 protruding inwardly from the periphery of said hole 19, and an upwardly extending supporting plate 22 having a fixing hole 21.

Said spacing plate 18 is mounted between adjacent rotor 1 and the hole 19 of said spacing plate 18 is fitted on the tubular stem 9, the small projection 20 being inserted in the elongated groove 12 of the tubular stem 9, while the fixing hole 21 of the supporting plate 22 receives a check rod 36 thereby fixing the spacing plate 18 to the tubular stem 9.

Figure 10:
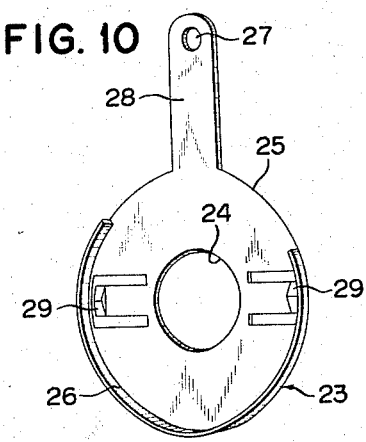
FIGURE 10 is a perspective view of a fixing plate used in the present invention.
Figure 18:
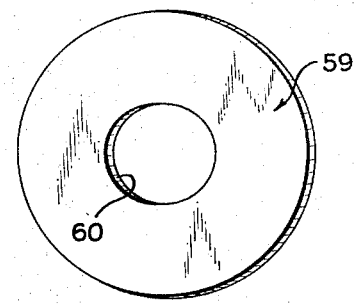
FIGURE 18 is a perspective view of a seating plate.

Referring to FIGS. 1 and 2, and particularly FIG. 18, numeral 59 designates a circular plate-like seating plate made of material such as stainless steel and plate 59 has a hole 60 loosely receiving the tubular stem 9. Said seating plate 59 is mounted between the edges of the wings of plate 2 and the back of a fixing plate 23 (FIG. 10). Thereby the rotor 1 is rotatable on stem 9 and the plate 59 holds the embossed symbol block 5 and the ink absorber 8 and prevents the fixing plate 23 from contacting the ink.

With reference to FIG. 2 and particularly to FIG. 10, numeral 23 designates a fixing plate which is made of material such as stainless steel and has substantially same configuration as said spacing plate 18. The fixing plate 23 is provided with a hole 24 for receiving the tubular stem 9 and the plate 23 is formed with an open section 25 and a section which is enclosed by a substantially U-shaped flange 26 (FIG. 10) placed at the periphery of said spacing plate 18. Said open section 25 provides a space for rotating rotor 1 through an angle of one slot 4 of said rotor 1. It will also be seen that resilient projections 29, made of material such as stainless steel, are provided at the inside of said flange 26, between the stem-receiving hole 24 and said flange. Also, at the upper part of said fixing plate 23, there is integrally formed a supporting plate 28 having a fixing hole 27. Said fixing plate 23 is mounted in abutting relation with the back of said driving element 13, while said tubular stem 9 is supported in the hole 24 and the check rod 36 is supported in the fixing hole 27 of the supporting plate 28. (In FIG. 2, four fixing plates are shown.)

Figure 11:
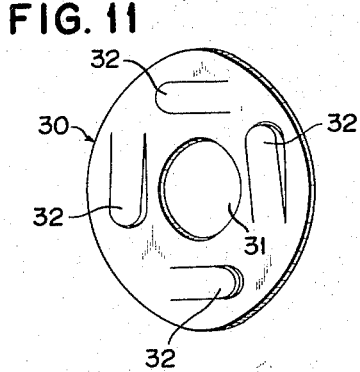
FIGURE 11 is a perspective view of a resilient securing plate used in the present invention.

While reference is now made to FIGS. 1 and 2 and particularly to FIG. 11, numeral 30 indicates a substantially circular resilient securing plate made of material such as stainless steel, with a stem-receiving hole 31 formed in the center thereof. On the outside plate-shaped face of said plate 30 (upper part of the plate in FIG. 11) are formed a suitably selected number of substantially U-shaped tongue projections 32 to provide resilient action to the plate. Said plate 30 is mounted in abutment with the outside of the fixing plate 23 and immediately inside of a rectangular machine frame 33 made of material such as stainless steel.

Figure 12:
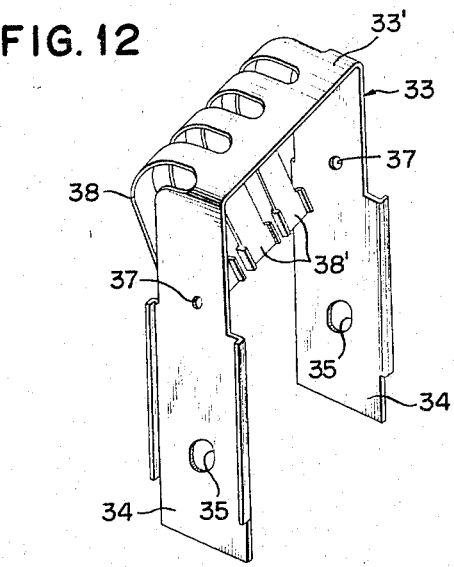
FIGURE 12 is a perspective view of a frame used in the present invention.

Referring now to FIGS. 1 to 6, particularly to FIG. 12, numeral 33 indicates the machine frame which is substantially of inverted U-shape section. It is so arranged that both side plates 34, are mounted in abutted relation with the outside of the plates 30, at both ends of the tubular stem 9. At the upper parts of both said side plates 34, where the check rod 36 is to be passed, there are formed holes 37, and at the location where the stem 9 is to be passed there are provided holes 35 for receiving said stem. It will also be seen that from the top 33' of the machine frame 33 are resiliently suspended leaf springs 38 in a number (four in FIG. 12) corresponding to the number of driving elements 13. Each of said leaf springs 38 has at its free end a section 38' which engages with the driving section 16 of the driving element 13.

Figure 17:
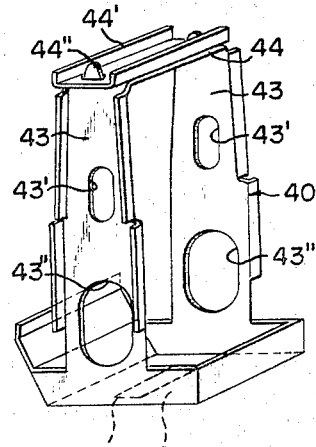
FIGURE 17 is a perspective view of a symbol block cover used in the present invention.

As shown in FIGS. 1 to 6, particularly in FIG. 17, there is also provided a symbol block cover 40 made of material such as stainless steel below the tubular stem 9 and the machine frame 33. Said cover 40, as best shown in FIG. 17, has at its bottom an elongated window or windows 42 through which any selected one of the embossed ridges 6 of the symbol block is exposed, and the cover 40 comprises a base 41 having indentations 56 and rubber buffer pieces 55 fitted in indentations 56, a pair of side plates 43, 43 having stem-receiving holes 43' and arranged substantially perpendicularly and in continuation of said base 41, and a top plate 44 having a spring shoe 44' and a pair of opposed lugs 44''. The holes 43'' of said block cover 40 receive the tubular stem 9 while the holes 43' receive the check rod 36 to secure them in position, respectively.

Figure 16:
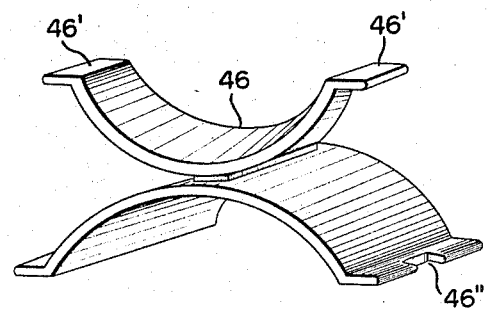
FIGURE 16 is a perspective view of a substantially X-shaped spring used in the present invention.

Reference is next made to FIGS. 1 to 6, and particularly to FIGS. 2 and 16, wherein it is seen that a generally X-shaped spring 46 composed of strong synthetic resin, such as polyacetal resin, is mounted in the spring shoe 44' on the top plate 44 of said symbol block cover 40. Notches 46'' formed at the legs of said spring 46 are engaged with the lugs 44'' on said top plate 44 while a pair of branched flanges 46', at the uppermost ends of the spring 46, are urged against the inner surface 47' of a casing 47 to be described later.

Referring now to FIGS. 1 to 6, particularly to FIGS. 1 and 2, the casing 47 is formed with elongated window openings 48 in a number corresponding to the number of the rotors 1 which are provided. At both sides of said casing 47 are provided integral side plates 49, having holes 50 for supporting both sides of the tubular stem 9. At one of said holes 50 (left hand side in FIG. 2) of the side plates 49, of said casing 47, the tubular stem 9 has provided at its one end check ring 39, packing 57, set screw 58 having ink inlet 58', and plug 10 in that order as shown in FIG. 15. At the other of the holes 50, the tubular stem 9 has mounted at the other end check ring 39, packing 57 and fastening member 52 in that order as shown in FIG. 15, so that only the base plate 41 of the block cover 40 may be exposed outside from the bottom openings of said casing 47.

In the device of the present invention as just described, when the cap 54 of the lever section 17 is released, the driving section 16 of the driving element 13 pressing the free end engaging section 38' of each leaf spring 38 suspended from the top end of the machine frame 33 will return to its normal position due to the restoring force of the leaf spring 38, thus permitting the lever section 17 to also return to its original position. This series of operations can be effected always positively by provision of the resilient protruded members 32 formed on the resilient securing plate 30 mounted in contact with the inside of the side plates 34 of the machine frame 33. Thus, the spacing plate 18, the side plates of the machine frame 33 and the securing plate 30 are secured to the tubular stem 9 through their respective holes 19, 35 and 31, while the open section 25 of the fixing plate 23 is so arranged as to engage the driving section 16 of the driving element 13, and the elastic projections 29 of said fixing plate 23 with the elastic claw clutch 15 of the driving element 13, each in proper relation with each slot 4 of the rotor 1, so that only by a simple pushing up operation of the lever section 17 of the driving element 13, it is possible to suitably arrange the desired symbols, such as letters and numerals, and to continuously effect stamping operation with no requirement for applying ink from a stamp pad for each stamping operation due to the presence of the ink absorber and the embossed symbol block impregnated with ink. Also, the ink supply may be easily replenished by removing the plug 10 inserted in the tubular stem 9 and refilling the stem with ink. Further, the device of the present invention as described above is simple to assemble and is suited for mass production. Further, if the revolving stamp according to the present invention is not to be used for a period of time, the surface of the embossed symbol block may be completely covered by sliding the casing 40, so that contact is prevented with the ink of the embossed symbol block even if the revolving stamp is left exposed on a surface, for example, the surface of a desk.

What is claimed is:

1. A revolving stamp comprising a hollow shaft adapted for being supplied with ink, said shaft having apertures for the outflow of ink therefrom, an assembly rotatably mounted on said shaft and including an elastic annular block of porous material having spaced projections with indicia thereon, an annular absorber member constituted of ink absorbent material mounted on said shaft for receiving ink therefrom via said apertures, said absorber member having an outer peripheral surface in contact with said block, a rotor member rotatably mounted on said shaft and including spaced plates engaged in the spaces between said projections on said annular block whereby the block is rotatable together with the rotor member, said rotor member having slots annularly arranged therein, a fixing plate mounted in angularly fixed relation on said shaft in contact with said rotor member on a side thereof opposite said plates thereof, and a seating member on said shaft adjacent said plates of the rotor member and cooperating with said rotor member to hold the absorber member and annular block in assembled relation; means for stepwise rotating the rotor member and thereby the absorber member, the latter said means comprising a driving element rotatably mounted on said shaft between said fixing plate and the rotor member and including an elastic clutch element engaged in one of said slots of the rotor member to rotate the same, said fixing plate having an opening of determinable annular extent, said driving element including a portion engaged in said opening of the fixing plate such that the driving element is limited in its angular movement, by said opening, to cause the annular block to move stepwise by the distance between adjacent projections on said block as said driving element traverses said opening, and elastic means acting on the driving element to urge the said portion thereof against the fixing plate at one end of said opening therein.

2. A stamp as claimed in claim 1, comprising a casing, a cover for said annular block slidably mounted in said casing and having extended and retracted positions, and an X-shaped spring of synthetic resin between said casing and cover, urging the latter to its extended position.

3. A stamp as claimed in claim 1, wherein said opening of the fixing plate is defined by a U-shaped flange on the periphery of said fixing plate.

4. A stamp as claimed in claim 1, comprising a frame supporting said assembly and said driving element, said frame having openings for the passage of said shaft, said frame including a rod secured therein, said fixing plate being connected to said rod to be fixed in angular position on said shaft.

5. A stamp as claimed in claim 4, comprising a casing surrounding said frame and having an opening for exposing said spaced projections on said annular block.

6. A stamp as claimed in claim 5, comprising a cover for said annular block slidably mounted in said casing, said cover having an opening for passage of said projections.

7. A stamp as claimed in claim 6, wherein a plurality of assemblies and corresponding driving elements are mounted on said shaft, said opening in the cover being elongated for passage of the projections of the block of each said assemblies.

8. A stamp as claimed in claim 7, wherein said elastic means which acts on each driving element comprises a left spring mounted on said frame and contacting the associated driving element.

9. A stamp as claimed in claim 7, comprising removable means at one end of said hollow shaft for furnishing access to the interior of the shaft for an ink filling operation.

10. A stamp as claimed in claim 7, comprising a spacing plate mounted on said shaft in fixed angular position between adjacent assemblies to isolate the respective blocks and absorber members, said spacing plate holding the shaft in fixed angular position so that said apertures face downwardly.

11. A stamp as claimed in claim 7, wherein each fixing plate includes a pair of flexible tongues in frictional engagement with the associated rotor member.

12. A stamp as claimed in claim 7, comprising a securing plate mounted on said shaft between said frame and the fixing plate adjacent thereto, said securing plate including tongue projections engaging said frame and said fixing plate to resiliently urge all of said assemblies and drive elements together.

References Cited

UNITED STATES PATENTS

| | | | |
|---|---|---|---|
| 593,946 | 11/1897 | Mandt | 267—7 |
| 907,128 | 12/1908 | Conrad | 101—83 |
| 2,589,682 | 3/1952 | Dudis | 101—109 |
| 2,663,257 | 12/1953 | Dudis | 101—327 |
| 2,498,980 | 2/1950 | Bowling et al. | 101—328 XR |
| 1,672,072 | 6/1928 | Chamberlain | 101—79 |
| 2,687,692 | 8/1954 | Kubovy et al. | 101—110 |
| 3,338,160 | 8/1967 | Heil | 101—99 |

FOREIGN PATENTS 850,895   9/1952   Germany.

ROBERT E. PULFREY, Primary Examiner

F. A. WINANS, Assistant Examiner.

U.S. Cl. X.R.

101—327